United States Patent Office 2,887,025
Patented May 19, 1959

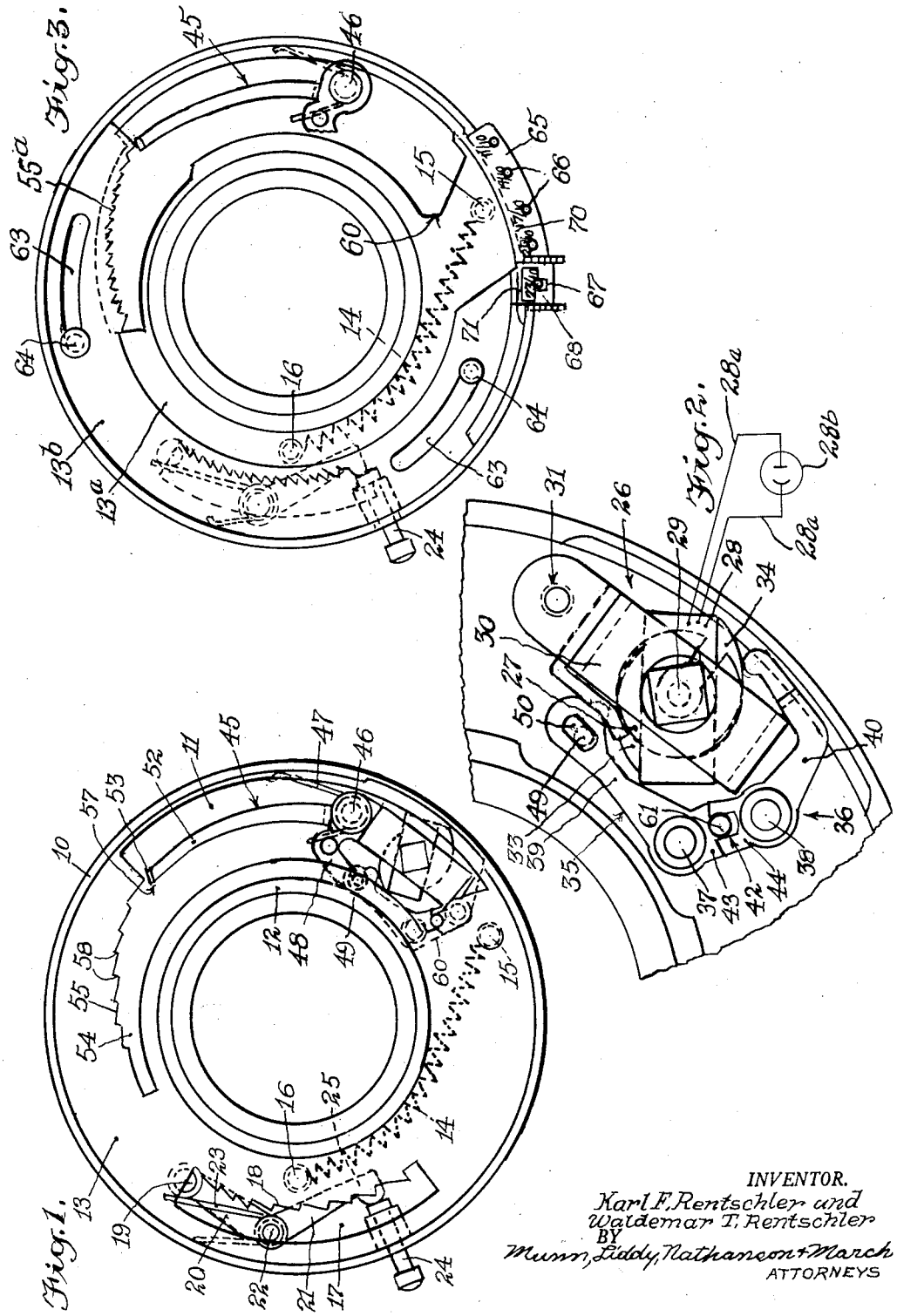

2,887,025

PHOTOGRAPHIC SHUTTER WITH EXPOSURE REGULATOR

Karl F. Rentschler and Waldemar T. Rentschler, Calmbach (Enz), Germany, assignors to Alfred Gauthier G.m.b.H., Calmbach (Enz), Germany, a corporation of Germany Application December 19, 1955, Serial No. 554,016

Claims priority, application Germany December 23, 1954

6 Claims. (Cl. 95—10)

This invention relates to photographic shutter structures, and more particularly to a shutter structure having incorporated therein an electric exposure regulator which includes a measuring device.

In photographic shutters, and particularly intra-lens shutters, there are often provided electric exposure regulators which respond to light values, enabling the operator to quickly and easily obtain the desired shutter setting for a particular set of light conditions. These electric exposure regulators include a measuring device in the form of an electrical instrument movement which has a permanent magnet and a movable coil system, the latter being delicately mounted to reduce friction inasmuch as the turning forces to which it is subjected are quite minute, and being also resiliently mounted to withstand shocks. The movable coil system ordinarily comprises a spindle carried in bearings and a coil mounted on the spindle, the leads or connections for the coil being brought out through spiral coil springs which also function to provide a bias to the spindle, opposing the torque of the coil. Such instrument movements by their very nature are relatively delicate and susceptible to shock, thus requiring shock-absorbent, elastic mountings. Moreover, they must be made very small in size and compact, in order to be fitted into the small space available in the shutter housing. These requirements present a number of problems, where it is desired that the output of the instrument movement be utilized for the purpose of making possible an accurate, semi-automatic control of the exposure setting member.

The present invention is aimed at solving these problems set up by the small and delicate nature of the instrument movement or measuring device, and one object of the invention is to provide an improved control mechanism responsive to the output of a measuring device of the above type, by which there is greatly minimized and held to a safe value the forces imposed on the measuring device in the process of utilizing the output thereof.

Another object of the invention is to provide an improved control means as above set forth, wherein the forces imposed on the measuring device are divided, arranged to be virtually balanced and to act in opposition, thereby to obviate any deleterious effects of such forces on the delicate moving coil system of the measuring device.

Yet another object of the invention is to provide an improved control mechanism as above characterized, wherein the movable part of the movable coil system of the measuring device is free of all restraint from the control means prior to utilization of the output of the measuring device for the purpose of regulating the exposure, thereby to enable said movable part accurately to respond to the set of light conditions existing at the time the exposure is to be made.

A still further object of the invention is to provide an improved control means in conjunction with an electric measuring device as above set forth, wherein the effect on the measuring device of setting of the movable exposure setting member is very greatly minimized if not wholly eliminated.

A feature of the invention resides in the provision of an improved control means combined with an electric measuring device in accordance with the above, wherein provision is made for adjusting to different film sensitivities without requiring alteration of the control means or modification of the advantageous action and functioning thereof.

In accomplishing the above objects there is provided, in accordance with the invention, a novel tracing means in conjunction with the electrical measuring device and particularly the movable coil system and spindle therefor. This novel tracing means comprises, in the specific embodiment of the invention illustrated herein, a pair of opposed congruent cams on the spindle of the movable coil system, and a pair of opposed, movable tracing members carried by the shutter housing and adapted to oppositely engage the said cams respectively. The movable tracing members are advantageously made in the form of levers or bell cranks which have cooperable arms for the purpose of coupling together the members for simultaneous movement. In conjunction with the tracing members there is provided, in accordance with the illustrated embodiment of the invention, an additional lever which is coupled to the tracing members to have simultaneous movement therewith, said additional lever and the movable exposure setting member having cooperable means by which the latter is adjustably limited in its movement to certain positions as determined by settings or positionings of the said additional lever.

By the provisions of the two, opposed tracing members acting on the opposed cam means of the movable coil system there is obviated unbalanced lateral forces on the spindle thereof, and accordingly the said system and spindle is protected against bending or other deformation, or damage from forces imposed on it by the said levers of the control means.

Moreover, as stated above, in order to render the measuring device shock-proof to the maximum extent the movable coil system and spindle thereof are provided with a yieldable or elastic mounting, and by the provision of the opposed tracing members in accordance with this invention there is minimized distortion and likelihood of damage to the said yieldable mounting.

By the provision of levers or bell cranks for the tracing members, one arm of each lever may be made engageable with the congruent cams, and the remaining arms of the levers will thus be available for coupling purposes, and in conjunction with this organization the provision of the additional lever having two arms results in the smallest possible number of mounting parts being required with the greatest possible accuracy for the transmission of movement, inasmuch as the additional lever may be arranged so that one arm thereof is coupled to the tracing members and the other arm constitutes a stop for engagement with the exposure setting member.

Moreover, the bearing of the said additional lever and the stop arm thereof are so constituted and arranged that during the function of limiting movement of the exposure setting member by said additional lever there is not imparted to the latter any torque which might increase the force exerted by the tracing members on the measuring device. If any torque results at all from such limiting of the movement of the exposure setting member, it will be in an opposite direction, thereby tending instead to disengage the tracing members from the congruent cams.

Moreover, to provide for free and unimpeded movement of the movable coil system and spindle of the measuring device prior to its functioning to control the exposure setting, there is provided a means by which the tracing members are disengaged from the congruent cams at all times that the exposure setting member is in its storage or starting position, prior to being set or having its movement limited in accordance with the response of the measuring device.

In order to not impair the efficiency and advantages of this control means comprising the opposed tracing levers and additional transmission lever, which latter is cooperable with the exposure setting lever, there is further provided an adjustable part on said setting member which is cooperable with the said additional lever, the arrangement being such that the setting member may be adjustably positioned with respect to said adjustable part or vice versa to adjust for different film sensitivities. Accordingly, no adjustment is required of the control means as such, which engages the measuring device and the exposure setting member. Thus, such control means may always function in its most efficient and advantageous manner.

Other features and advantages will hereinafter appear.

In the drawings accompanying this specification illustrating one embodiment of the invention, similar characters of reference indicate corresponding parts wherever possible in the several views, in which:

Figure 1 is a front elevational view of a camera shutter having incorporated therein an exposure regulator comprising a measuring device, exposure setting member, and control means or tracing and transmission system cooperable with the measuring device and the exposure setting member. The latter member is shown in storage or starting position.

Fig. 2 is an enlarged fragmentary elevational view of a portion of the shutter shown in Fig. 1, showing in detail the tracing members and measuring device associated therewith.

Fig. 3 is a front elevational view illustrating a form of the invention wherein the exposure setting member has an adjustable part or portion cooperable with the control means for the setting member, for the purpose of adjusting for different film sensitivities.

Referring to Figs. 1 and 2 there is shown a shutter housing 10 having a base plate 11 provided with a nozzle 12 by which the usual lens structure may be mounted on the shutter housing. Rotatably mounted on the nozzle or collar 12 of the housing is an exposure setting member 13, said setting member being arranged in the well known manner with respect to the structure of the shutter, for either setting the shutter speed or the diaphragm, or for setting the time-diaphragm proportion. The exposure setting member 13 is normally spring urged counterclockwise by a helical coil spring 14 at one end secured to a pin 15 fixed on the housing 10. The other end of the spring 14 is connected with a pin 16 secured to the setting member 13.

Control of counterclockwise movement of the exposure setting member 13 is effected by the provision of a notch or slot 17 in said member, having a series of steps or teeth 18 engageable by a semicircular pin 19 mounted on the arm 20 of a lever 21 which pivots about a pin 22 secured to the base plate 11. The lever 21 is spring-urged clockwise by a coil spring 23 which thereby tends to maintain the pin 19 in engagement with the steps 18 of the setting member, said steps being shown in the form of ratchet teeth whereby they may bypass the pin 19 for a clockwise turning of the member 13, but will lock with the pin and prevent counterclockwise turning of the member.

Control of the lever 21 is effected by a manually engageable button 24 carried by the housing 10, said button engaging a second arm 25 of the lever, as shown. It will be understood that when the exposure setting member 13 is shifted clockwise it will be retained in various rotative positions by the ratchet device comprising the steps 18 and the pin 19, and upon the button 24 being depressed the ratchet device will be released, thus enabling the spring 14 to return the setting member 13 to its storage or starting position as shown in Fig. 1.

Within the housing 10 there is provided a measuring device indicated generally by the numeral 26, said measuring device having the usual permanent magnet 27 and movable coil system comprising a coil 28 and spindle 29 therefor. It will be understood that the coil 28 may be connected by wires 28a to a photocell 28b, as is usual in the art. The magnet 27 and movable coil system including the spindle 29 is yieldably or resiliently mounted on the base plate 11 by means of a suitable bracket 30 elastically secured, as at 31, to the base plate 11.

In accordance with the present invention there is provided a novel control means in conjunction with the measuring device 26, by which the response of said device to various light conditions will determine the amount of movement which may be imparted to the exposure setting ring 13, thereby to enable the operator to properly set the shutter, diaphragm or other adjustable device of the shutter mechanism. This control means is characterized by relatively few parts of simple construction, is extremely accurate and effective in its operation, and imposes no load or force on the measuring device 26 which might damage or interfere with the operation of the latter.

In accomplishing this, as shown in Figs. 1 and 2, there is provided on the movable coil system of the measure device 26 a pair of oppositely-disposed, congruent cams 33 and 34 of the drum or disk type. Cooperable with the cams 33 and 34 are tracing members in the form of levers or bell cranks 35 and 36 respectively. As clearly shown in Fig. 2, the bell cranks 35 and 36 are carried by pivots 37 and 38 secured to the base plate 11, and have relatively long arms 39 and 40 engageable respectively with opposite surfaces of the cam parts 33 and 34. The arms 39 and 40 thus engage opposite sides of the moving coil system of the measuring device 26 and impart substantially balanced forces thereto, by which there is avoided any influence which might distort or deform the movable coil system or render it inoperative.

The tracing members 35 and 36 are coupled together for simultaneous opposite movements by the provision of a pin and slot connection 42 between the remaining arms 43 and 44 of the bell cranks.

There is further provided, in accordance with the invention, an advantageous transmission actuated by the tracing members 35 and 36, said transmission being in the form of a two-armed lever 45 pivotally carried by a pin 46 secured to the base plate 11, the lever 45 being spring-urged with a light pressure in a counterclockwise direction by a coil spring 47. The lever 45 has an arm 48 provided with a pin 49 which is received in a slot 50 in the arm 39 of the bell crank 35. Thus, the tracing members or bell cranks 35 and 36 are coupled to the lever 45 to cause the latter to move simultaneously therewith.

For the purpose of controlling or limiting clockwise movement which may be imparted to the exposure setting 13 in accordance with the light conditions existing at the time of exposure, as determined by the measuring device 26, the lever 45 is provided with a relatively long arm 52 having at its upper extremity a stop lug 53, and the exposure setting member 13 is provided with an arcuate slot 54 having in its upper edge a series of steps or teeth 55 of the ratchet type, cooperable with the stop 53 of the lever 45. The teeth 55 of the member 13 are located successively closer to the center or axis of the shutter as the slot 54 is traversed from right to left as viewed in Fig. 1, and accordingly slightly different rotative positions of the lever 45 will result in engagement of the stop 53 thereof with different steps 55 when the setting member 13 is shifted clockwise. The arrangement is such that the positioning of the bell cranks 35 and 36 as effected by the measuring device 26 will position the lever 45 and stop 53 to engage a selected one of the steps 55 upon clockwise turning of the setting member 13, such that the proper adjustments of the shutter are made for the particular light conditions to which the measuring device 26 has responded.

In accordance with the present invention the pivot 46 for the lever 45 is chosen to be inside of the arcuate line or curvature defined by the steps 55, and the upper surface 57 of the stop 53 is arranged to be tangential to the arcuate path of movement of the stop 53 whereby, during functioning of the stop in halting clockwise turning of the setting member 13, virtually no torque will be imparted to the lever 45 and in turn to the bell cranks 35 and 36, or if any torque is imparted thereto it will be in a clockwise direction whereupon the tendency will be to swing the bell cranks 35 and 36 away from the cam parts 33 and 34 which they engage. Thus, the measuring device 26 will be protected against distortion and damage, which might otherwise occur if forces were imparted to the lever 45 during its function of halting the setting member 13 upon the latter being shifted clockwise. This is an important feature of the present invention. It will be noted that the sharp edges 58 of the teeth or steps 55 will engage the tangential surface 57 along a line of action or force which, if extended, would pass outside of or to the right of the pivot 46, and because of this under no circumstance could there be imparted to the lever 45 a counterclockwise torque. Therefore, the measuring device 26 is at all times safeguarded from forces which might result in consequence of the setting member 13 being shifted clockwise to the position indicated by the measuring device as being suitable for the particular conditions of light.

In the action of the lever 45 and bell cranks 35 and 36 the light or delicate spring 47 will function to normally maintain the arms 39 and 40 of the bell cranks in engagement with the cam parts 33 and 34.

After the exposure setting member 13 has been properly set by shifting it in clockwise direction and the exposure taken, such setting being maintained prior to the exposure by the ratchet means 18—19, the setting member will be again returned to its starting position in response to release of said ratchet means upon actuation of the depressible pin 24.

In accordance with the present invention there is provided a means by which the bell cranks 35 and 36 are disengaged from the cam parts whenever the setting member 13 is in its storage or starting position as shown in Fig. 1, thereby freeing the movable coil system of the measuring device for unimpeded movement and response to the light conditions. In accomplishing this, referring to Figs. 1 and 2, the slot 54 of the setting member 13 is provided with an abutting edge 60 which is engageable with the pin 61 of the pin and slot connection 42 between the bell cranks. When the setting member 13 is in the Fig. 1 position, the edge 60 displaces the pin 61 a slight amount to the right, thereby moving apart the arms 39 and 40 of the bell cranks and disengaging said arms from the cam parts 33 and 34. Thus the movable coil system of the measuring device is freed for unimpeded movement, and the device can accurately respond to the various conditions of light which exist at the exterior of the shutter.

Further, in accordance with the present invention, there is provided as shown in Fig. 3 an exposure setting member 13a having an adjustable ratchet or cam part 13b by which the positioning of the setting member may be altered to suit different film sensitivities without involving any change in the control mechanism above described. As shown in Fig. 3, the part 13b of the setting member is of arcuate shape, having teeth or steps 55a cooperable with the stop lever 45. The part 13b has arcuate slots 63 receiving pins 64 which are fixed on the member 13a. By this mounting, relative turning movement may be effected between the members 13a and 13b, to variably position the latter on the member 13a.

A friction detent device is provided between the members 13a and 13b, comprising a segment-shaped plate 65 on the member 13a, having projections 66 which may be received in a notch 67 of an extension 68 secured to the member 13b. The plate 65 may be in the form of a scale, having indicia 70 corresponding to different film sensitivities, and the extension 68 may have a window 71 through which the indicia 70 may be viewed. By setting the member 13b with respect to the member 13a and in accordance with the indicia 70 of the scale 65, the abutment teeth 55a of the member 13b can be placed at different positions with respect to the stop lever 45, and accordingly this will permit either a greater or lesser arcuate movement of the setting member 13a to be effected in response to a given response of the measuring device 26. Therefore there is provided a means by which adjustment may be made for different film sensitivities without requiring alteration in the least of the lever-type control described above, which is responsive to the output of the measuring device 26. Accordingly, the efficiency and effectiveness of such control is not impaired or altered, even though the different settings shown in Fig. 3 are employed to compensate for different film sensitivities.

It will be readily understood that there has been provided by the present invention, as set forth in detail above, an improved and very advantageous control means or tracing and transmission system for use in a camera shutter provided with an exposure regulator. Such control means or system does not impose on the measuring device of the exposure regulator any large or unbalanced forces which might distort or render inoperative such device. The control means is, moreover, extremely accurate and efficient, and constituted of few parts which are of simple construction and economical to manufacture. There is also provided a novel means by which the movable part of the measuring device is released for unimpeded response to the light conditions when the setting member is at its storage or starting position, and a novel and simple means associated with the setting member and independent of the aforesaid control means, by which compensation or adjustment may be had to cope with different film sensitivities.

Variations and modifications may be made within the scope of the claims and portions of the improvements may be used without others.

We claim:

1. A photographic intra-lens shutter structure having a shutter casing, and having disposed within said shutter casing, in combination; a photoelectric measuring device having in its output side a movable part responsive to light conditions and including a pair of oppositely disposed movable cam surfaces a pair of movable tracing members comprising two-armed levers single arms of which are simultaneously engageable with opposite sides respectively of said cam surfaces, said single arms being oppositely movable and being positioned by said cam surfaces; means coupling said tracing members for simultaneous opposite movements, said coupling means including the other arms of said two-armed levers; an exposure-setting member movably mounted in said shutter casing; a movable stop member comprising a stop lever movably mounted in the shutter casing said stop lever being separate from said two-armed levers which engage the cam surfaces, and said stop lever and setting member being movable into and out of engagement with each other; cooperable multiple abutment means on said stop lever and setting member, limiting unidirectional movement of the latter member to one of a plurality of different positions as determined by the position of said stop lever; and means in the shutter casing, coupling said tracing and stop levers for simultaneous movement, thereby to effect a predetermined positioning of the stop lever in response to positioning of the tracing levers.

2. The invention as defined in claim 1, in which the movable part of the measuring device is rotatable and the opposed cam surfaces are fixed with respect to each other, and in which the tracing levers comprise bell cranks having one set of tracing arms engageable with said cam surfaces and having cooperable pin-and-slot means on the other set of arms, connecting the bell cranks for simultaneous movement, and in which the means coupling the tracing and stop levers comprises a pin-and-slot connection to one tracing arm.

3. The invention as defined in claim 1, in which the exposure setting member has a plurality of aligned steps extending generally in the direction of the line of movement of said setting member, in which the stop member comprises a lever having a pivot disposed generally in the line of movement of said steps thereby to minimize the transmission of force from the setting member to the stop member in a direction to cause turning of the latter, and in which the surface of the stop member which is engageable with the exposure setting member is disposed in a plane substantially perpendicular to the said line of movement.

4. The invention as defined in claim 1, in which the said cooperable means on the stop and setting members includes a part adjustably carried by the setting member and movable thereon to a plurality of different adjusted positions.

5. The invention as defined in claim 4, in which the exposure setting member has an arcuate path of movement, and in which the adjustable part thereof is ring-shaped and is arcuately movable on said setting member.

6. The invention as defined in claim 5, in which the exposure setting member has a scale, in which the adjustable part thereon has an index means cooperable with said scale, and in which there are cooperable notches and projections on said member and adjustable part, for releasably holding the part in adjusted position on the member.

References Cited in the file of this patent

UNITED STATES PATENTS

| | | |
|---|---|---|
| 2,188,820 | Riszdorfer | Jan. 30, 1940 |
| 2,388,609 | Ericsson | Nov. 6, 1945 |

FOREIGN PATENTS

| | | |
|---|---|---|
| 850,239 | France | Dec. 11, 1939 |
| 842,887 | Germany | Nov. 20, 1952 |